(12) United States Patent
Hecht (10) Patent No.: US 8,851,014 B2
(45) Date of Patent: Oct. 7, 2014

(54) LITTER BOX ASSEMBLY

(76) Inventor: Brian Hecht, Findlay, OH (US)

( * ) Notice: Subject to any disclaimer, the term of this patent is extended or adjusted under 35 U.S.C. 154(b) by 95 days.

(21) Appl. No.: 13/306,113

(22) Filed: Nov. 29, 2011

(65) Prior Publication Data

US 2013/0133585 A1    May 30, 2013

(51) Int. Cl.
*A01K 29/00*    (2006.01)

(52) U.S. Cl.
USPC ............................................. 119/166

(58) Field of Classification Search
USPC .................. 119/161, 162, 166, 165, 169, 170
See application file for complete search history.

(56) References Cited

U.S. PATENT DOCUMENTS

| | | | |
|---|---|---|---|
| 4,817,560 A | 4/1989 | Prince et al. ...................... 119/1 |
| 5,195,464 A * | 3/1993 | Mutter ........................... 119/165 |
| 5,325,815 A | 7/1994 | Gumpesberger .............. 119/166 |
| 5,463,982 A * | 11/1995 | Murphy ......................... 119/166 |
| 5,515,812 A * | 5/1996 | Faust ............................. 119/166 |
| 5,517,947 A | 5/1996 | Christman .................... 119/166 |
| 5,531,186 A | 7/1996 | Flood et al. ................... 119/166 |
| 5,598,810 A | 2/1997 | Lawton, III ................... 119/166 |
| 5,615,639 A * | 4/1997 | Knight ........................... 119/168 |
| 5,701,844 A | 12/1997 | Murphy ......................... 119/166 |
| 5,799,610 A | 9/1998 | Poulos ........................... 119/166 |
| 5,893,336 A | 4/1999 | Vice et al. ..................... 119/166 |
| 6,269,772 B1 | 8/2001 | Mickey .......................... 119/166 |
| 6,354,243 B1 * | 3/2002 | Lewis et al. ................... 119/165 |
| 6,745,719 B1 * | 6/2004 | Howerton ...................... 119/166 |
| 6,941,894 B2 | 9/2005 | Scotto D'Anielo ........... 119/166 |
| 7,597,063 B2 | 10/2009 | Hartzell ......................... 119/166 |
| 2009/0178622 A1 * | 7/2009 | Havluciyan ................... 119/161 |
| 2012/0204800 A1 * | 8/2012 | Beaudoin et al. ............. 119/166 |

* cited by examiner

*Primary Examiner* — David Parsley
*Assistant Examiner* — George Andonyan
(74) *Attorney, Agent, or Firm* — Kusner & Jaffe (57) ABSTRACT

A cat litter box assembly having a base tray and an insert. The base tray has opposing side walls and a front wall. The front wall has a height less than the opposing side walls to define a partially open end of the base tray. The insert has a bottom wall and opposing side walls. The bottom wall has a plurality of openings formed in a portion thereof and a leading edge that extends between ends of the opposing side walls. The leading edge of the bottom wall and ends of the opposing side walls define an open end of the insert. The insert is insertable into the base tray through the partially open end of the base tray such that the leading edge of the insert engages and slides along the bottom wall of the base tray as the insert is inserted into the base tray.

11 Claims, 7 Drawing Sheets

LITTER BOX ASSEMBLY

FIELD OF THE INVENTION

The present invention relates to cat litter boxes.

BACKGROUND OF THE INVENTION

A cat litter box is commonly used by cat owners to provide a location for a cat to dispose of excrement and/or solid waste. The litter box is usually filled with a clumping litter material that adheres to the excrement to form small clumps of material. The owner of the cat removes the clumps and the solid waste while leaving unused litter material for future use by the cat.

The present invention provides an improved litter box assembly having a base tray with a partially open end for allowing a user to position easily and quickly an insert back into the base tray of the litter box assembly.

SUMMARY OF THE INVENTION

In accordance with a preferred embodiment of the present invention, there is provided a cat litter box having a base tray and an insert. The base tray has a bottom wall, opposing side walls, a back wall and a front wall. The front wall has a height less than the opposing side walls and the back wall to define a partially open end of the base tray. The insert is dimensioned to be disposed within the base tray. The insert has a bottom wall, opposing side walls and a back wall. The bottom wall has a plurality of openings formed in a portion thereof and a leading edge that extends between the ends of the opposing side walls. The leading edge of the bottom wall and the ends of the opposing side walls define an open end of the insert. The insert is insertable into the base tray through the partially open end of the base tray wherein the leading edge of the insert engages and slides along the bottom wall of the base tray as the insert is inserted into the base tray.

In accordance with another embodiment of the present invention, there is provided a cat litter box having a base tray and an insert. The base tray has a bottom wall, opposing side walls, a back wall and a front wall. The front wall has a height that is less than about 50% of the height of the opposing side walls and the back wall to define a partially open end of the base tray. The insert is dimensioned to be disposed within the base tray. The insert has a bottom wall, opposing side walls and a back wall. The bottom wall has a plurality of openings formed in a portion thereof and a leading edge that extends between the ends of the opposing side walls. The leading edge of the bottom wall and the ends of the opposing side walls define an open end of the insert. The insert is insertable into the base tray through the partially open end of the base tray wherein the leading edge of the insert engages and slides along the bottom wall of the base tray as the insert is inserted into the base tray.

An advantage of the present invention is a cat litter box for removing waste material from a litter material using an insert.

Another advantage of the present invention is a cat litter box that is easy to use.

Yet another advantage of the present invention is a cat litter box as described above having a removable insert that includes a screen portion for retaining thereon solid waste and urine (liquid) that has mixed with a clumping litter material to form clumps of material.

Another advantage of the present invention is a cat litter box as described above wherein the screen portion of the insert allows litter material to pass easily through.

Still another advantage of the present invention is a cat litter box as described above wherein the insert is light weight for allowing easy removal of the insert from the cat litter box.

Yet another advantage of the present invention is a cat litter box as described above that does not require multiple inserts to separate solid waste and clumps of material from litter material.

Another advantage of the present invention is a cat litter box as described above that allows for easy insertion of the insert into a base tray of the litter box assembly when litter material is disposed in the base tray.

A still further advantage of the present invention is a cat litter box as described above wherein the insert includes a leading edge for allowing easy insertion of the insert into the base tray when litter material is disposed in the base tray.

Another advantage of the present invention is a cat litter box as described above that allows for the leading edge of the insert to easily scoop, scrape, or mix litter material when the insert is inserted into the base tray.

Yet another advantage of the present invention is a cat litter box as described above that includes flanges on the insert and flanges on the base tray for guiding the insert as the insert is inserted into the base tray.

Yet another advantage of the present invention is a cat litter box as described above that includes flanges on the insert and flanges on the base tray to facilitate the removal and reinsertion of the insert into the base tray.

Another advantage of the present invention is a cat litter box as described above that includes flanges on the insert and flanges on the base tray which enable the user to easily move the litter box assembly to another location.

Another advantage of the present invention is a cat litter box that is space saving. It requires minimal space for use and storage. It is not necessary to roll the box to multiple locations nor is it necessary to stack/remove multiple trays during excrement removal.

Another advantage of the present invention is a cat litter box as described above wherein the screen portion of the insert allows litter material to pass easily through, thereby decreasing the introduction of dust and litter material into the air unlike other litter box designs.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
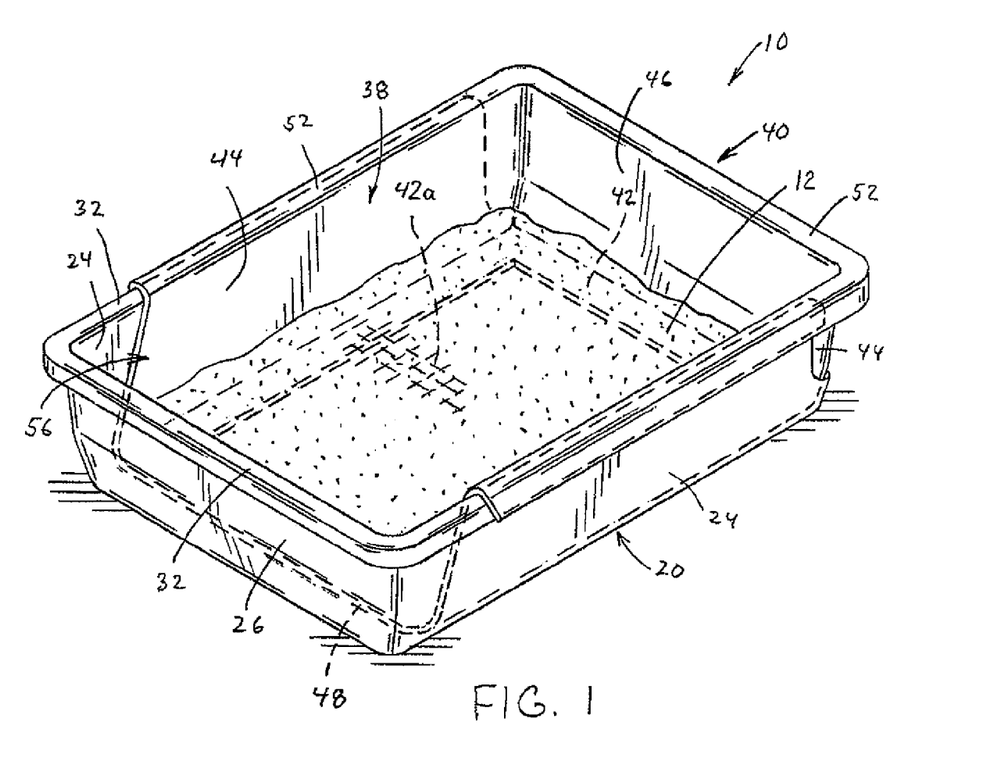
FIG. 1 is a perspective view of a litter box assembly illustrating a preferred embodiment of the present invention.

Referring now to the drawings wherein the showings are for the purpose of illustrating a preferred embodiment of the invention only and not for the purpose of limiting the same, FIG. 1 shows a litter box assembly 10 illustrating a preferred embodiment of the present invention. In FIG. 1, litter box assembly 10 is shown containing a conventionally known litter material 12.

Figure 7:
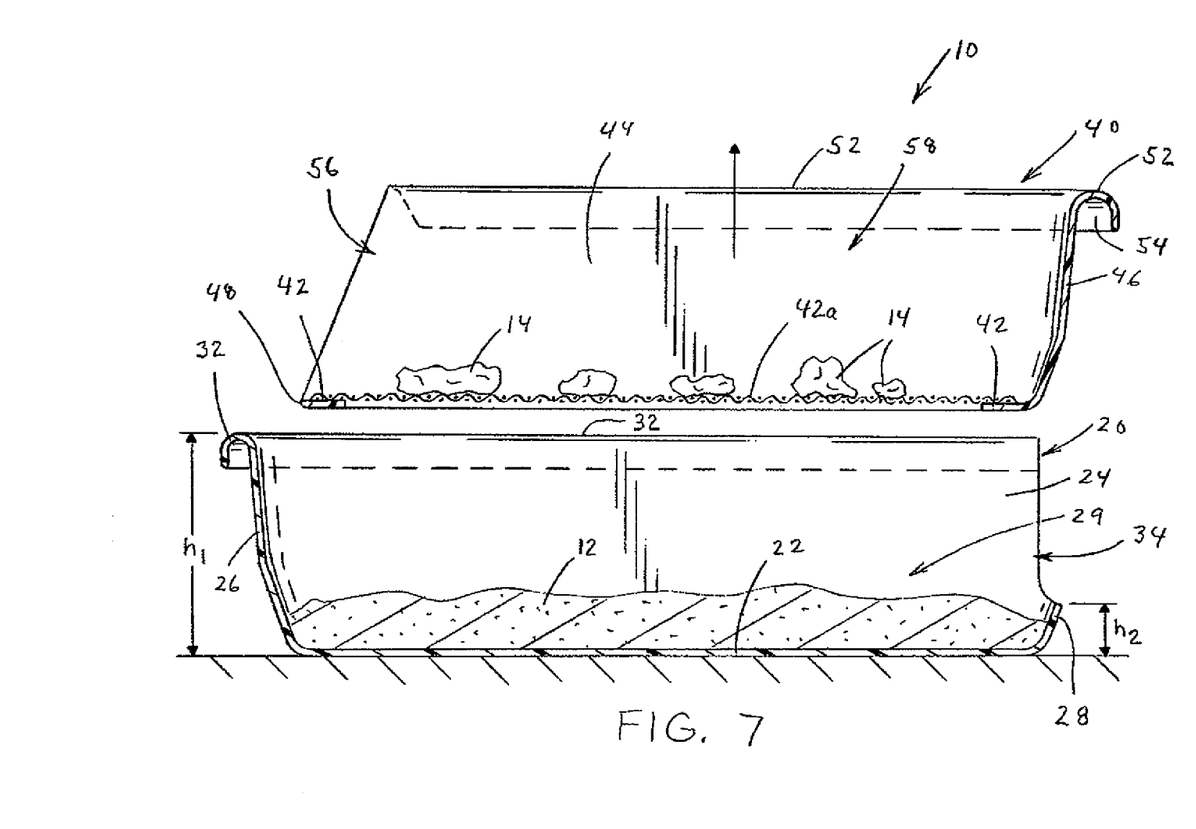
FIG. 7 is a cross sectional view of the litter box assembly showing the insert removed from the base tray.

Referring now to FIGS. 2-8, litter box assembly 10 includes a base tray 20 and an insert 40. Base tray 20 has a bottom wall 22, opposing side walls 24, a back wall 26 and a front wall 28. In the embodiment shown, base tray 20 is generally rectangular in shape. Opposing side walls 24, back wall 26 and front wall 28 extend from bottom wall 22. As best seen in FIG. 7, front wall 28 of base tray 20 has a height ($h_2$) that is less than a height ($h_1$) of opposing side walls 24 and back wall 26. In a preferred embodiment of the present invention, height ($h_2$) of front wall is about 25%, preferably between about 25% to about 45% of opposing side walls 24 and back wall 26.

Figure 4:
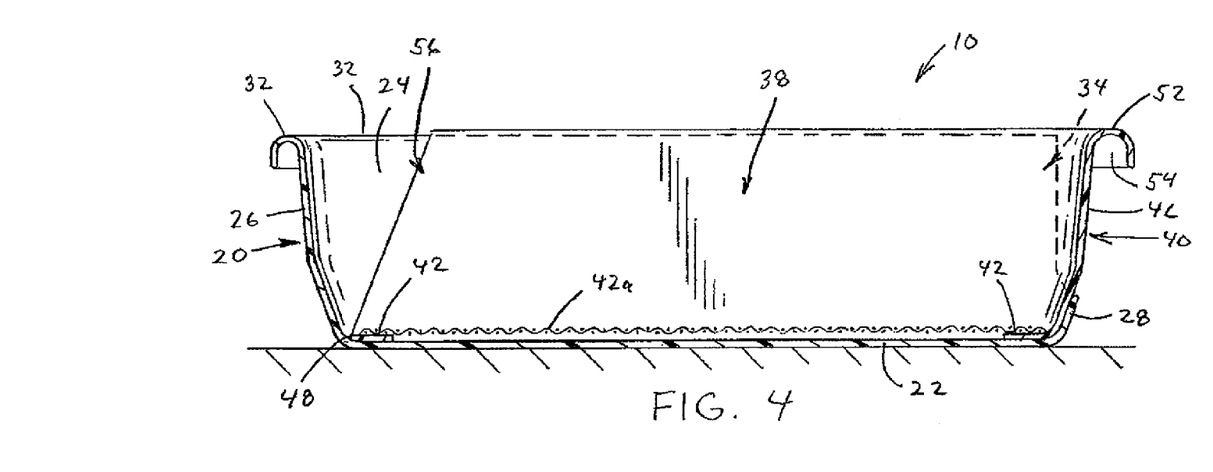
FIG. 4 is a cross sectional view of the litter box assembly taken along lines 4-4 of FIG. 3.

In the embodiment shown, back wall 26 of tray 20 includes a lower portion and an upper portion (see FIG. 4). The lower portion of back wall 26 is disposed at a first angle relative to bottom wall 22 and the upper portion of back wall 26 is disposed at a second angle relative to bottom wall 22. Opposing side walls 24, back wall 26 and front wall 28 define a recess 29 of tray 20. Recess 29 is designed to hold a predetermined amount of litter material 12. In particular, the height of front wall 28 is at least a minimum height needed to retain the predetermined amount of litter material 12 within base tray 20 while still allowing for easy insertion of insert 40 therein, as described in detail below. In the embodiment shown, height ($h_2$) of front wall 28 is between about 1.0 inch to about 2.5 inches, preferably between about 1.25 inches to about 2.25 inches, more preferably about 1.75 inches.

The upper edges of opposing side walls 24 and the upper edge of back wall 26 define a flange 32 that extends outwardly therefrom. In the embodiment shown, flange 32 is J-shaped with a rounded upper surface and a leg that extends toward bottom wall 22 (see FIGS. 4 and 5).

Insert 40 is dimensioned to be received into recess 29 of base tray 20. Insert 40 includes a bottom wall 42, opposing side walls 44 and a back wall 46. In the embodiment shown, insert 40 is generally rectangular in shape. Opposing side walls 44 and back wall 46 extend from bottom wall 42 to define an opening 58 of insert 40. One end of opposing of side walls 44 opposite back wall 46 is contoured to form a sloped surface that extends from the upper edge of side walls 44 to bottom wall 42. In the embodiment shown, back wall 46 includes a lower portion and an upper portion. The lower portion of back wall 46 is disposed at a first angle relative to bottom wall 42 and the upper portion of back wall 46 is disposed at a second angle relative to bottom wall 42.

Figure 2:
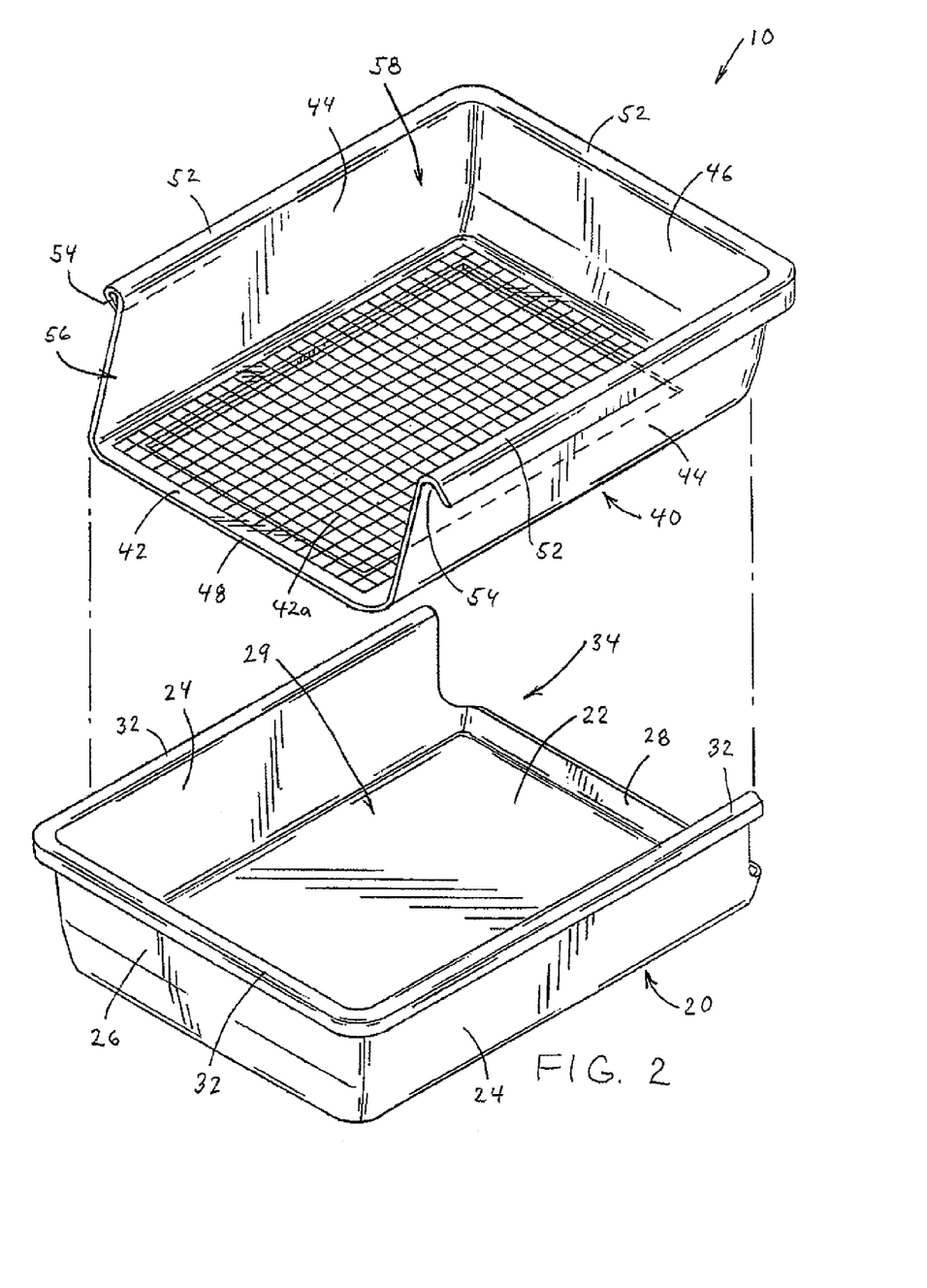
FIG. 2 is an exploded view of the litter box assembly shown in FIG. 1, showing an insert separated from a base tray.
Figure 3:
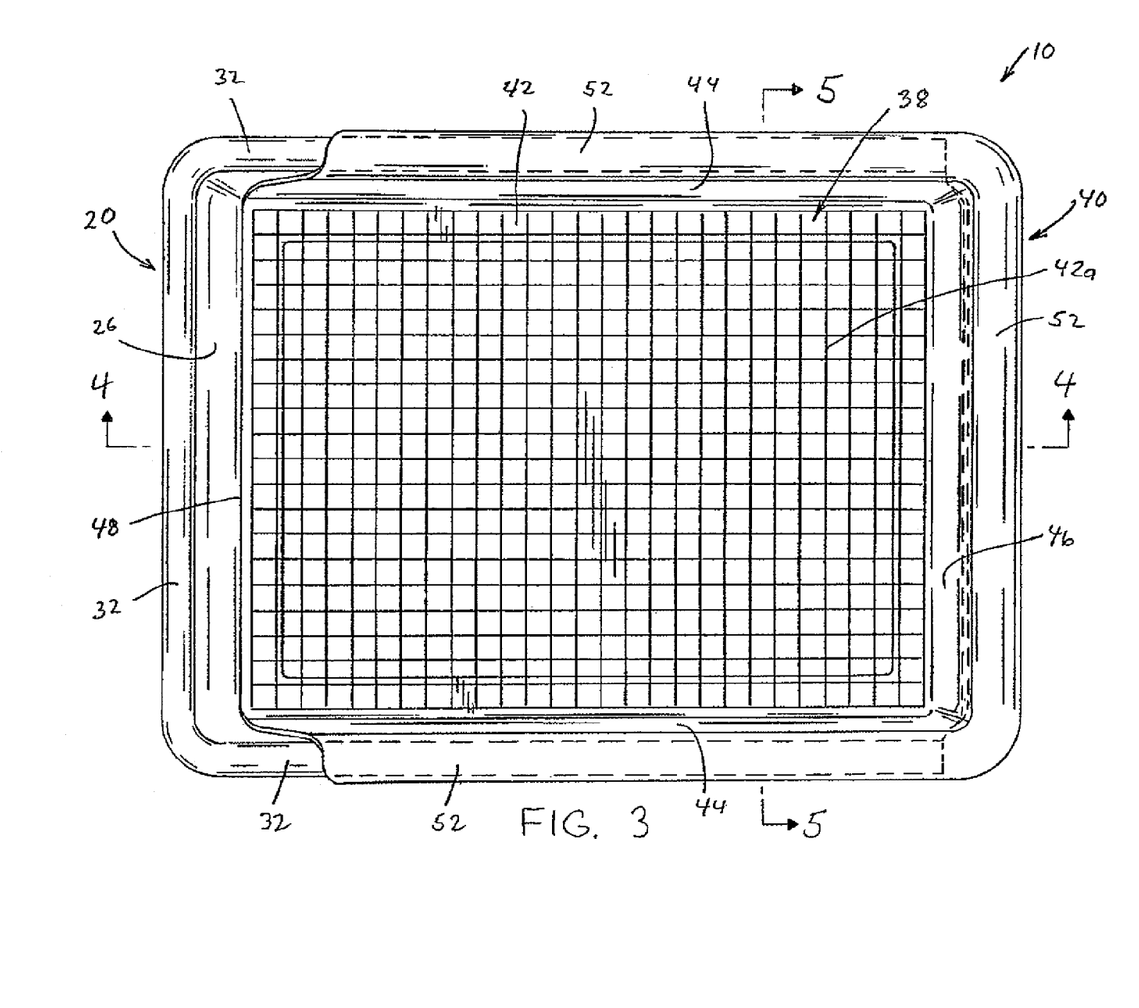
FIG. 3 is a top plan view of the litter box assembly shown in FIG. 1.

Bottom wall 42 includes a leading edge 48. Leading edge 48 extends between the aforementioned contoured ends of opposing side walls 44 of insert 40. In this respect, leading edge 48 and the ends of opposing side walls 44 define an open end 56 of insert 40. Bottom wall 42 also includes a screened portion 42a. Screen portion 42a is formed by a plurality of openings that extend through bottom wall 42. Screen portion 42a of bottom wall 42 is dimensioned as shall be described in detail below. It is contemplated that various methods may be used to form screen portion 42a of bottom wall 42. For example, screen portion 42a may be formed by placing a screen over a rectangular opening in bottom wall 42, as shown in FIGS. 2 and 3. Screen portion 42a may also be formed by a plurality of holes extending through bottom wall 42.

Figure 5:
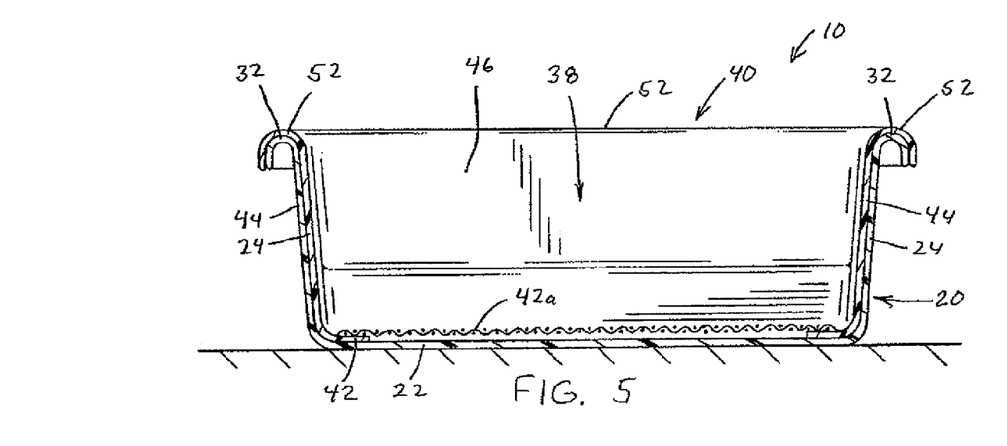
FIG. 5 is a cross sectional view of the litter box assembly taken along lines 5-5 of FIG. 3.
Figure 6:
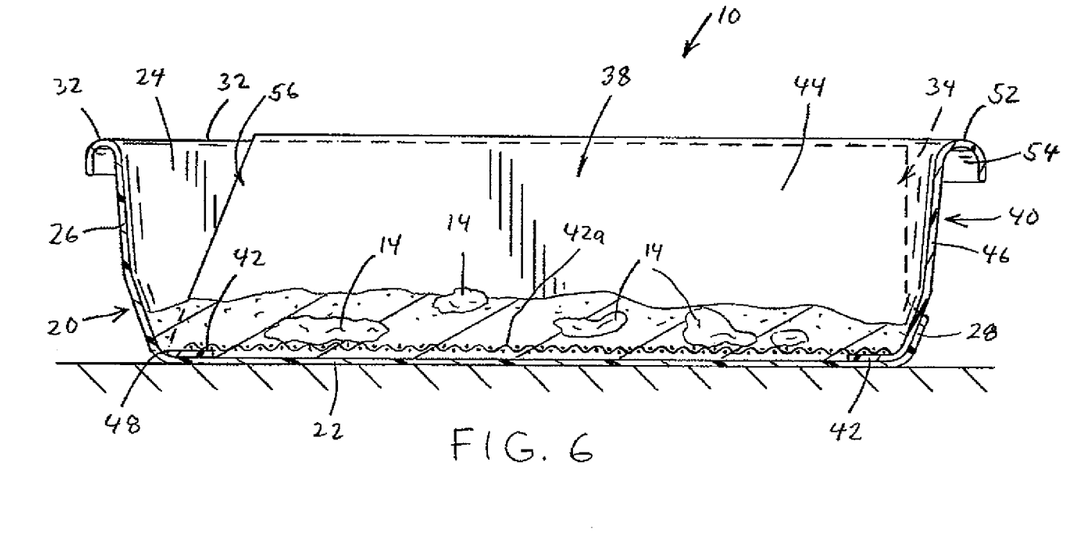
FIG. 6 is a cross sectional view of the litter box assembly showing a litter material, solid waste and clumps of material in the litter box assembly.

The upper edges of opposing side walls 44 and the upper edge of back wall 46 define a mating flange 52 that extends outwardly therefrom. Mating flange 52 defines openings 54 at the ends of opposing side walls 44. In the embodiment shown, mating flange 52 is J-shaped with a rounded upper surface and leg that extends toward bottom wall 42 of insert 40, as shown in FIGS. 4 and 5. Further, in the embodiment shown, a leading edge of mating flange 52 is tapered toward back wall 46 of insert 40, as best shown in FIG. 7.

The present invention will now be described in relation to the operation of litter box assembly 10. As shown in FIGS. 3-5, insert 40 is dimensioned to be received into recess 29 of base tray 20. In particular, insert 40 is dimensioned to be nested into base tray 20 so that bottom wall 42 of insert 40 is disposed next to bottom wall 22 of base tray 20, back wall 46 of insert 40 is disposed next to front wall 28 of base tray 20, opposing side walls 44 of insert 40 are disposed next to opposing side walls 24 of base tray 20 and flange 52 of insert 40 mates with flange 32 of base tray 20. In this respect, opposing side walls 44 of insert 40, back wall 42 of insert 40 and front wall 28 of base tray 20 define a cavity 38 of litter box assembly 10. Litter material 12 is placed into cavity 38 of litter box assembly 10, as shown in FIG. 1. In particular, litter material 12 rests on screen portion 42a of insert 40 and a portion of litter material 12 passes through screen portion 42a and rests on bottom wall 22 of base tray 20.

After a pet has excreted or deposited solid waste into litter material 12, litter material 12 adheres to the excrement to form clumps of material. Reference number 14 is used in the drawings to identify the solid waste and the clumps of material. To remove solid waste and clumps 14, a user lifts insert 40 away from base tray 20, as shown in FIG. 7. Screen portion 42a of insert 42 is dimensioned such that litter material 12 will pass freely through but solid waste and clumps 14 will remain in insert 40. Solid waste and clumps 14 are then disposed of by the user.

Figure 8:
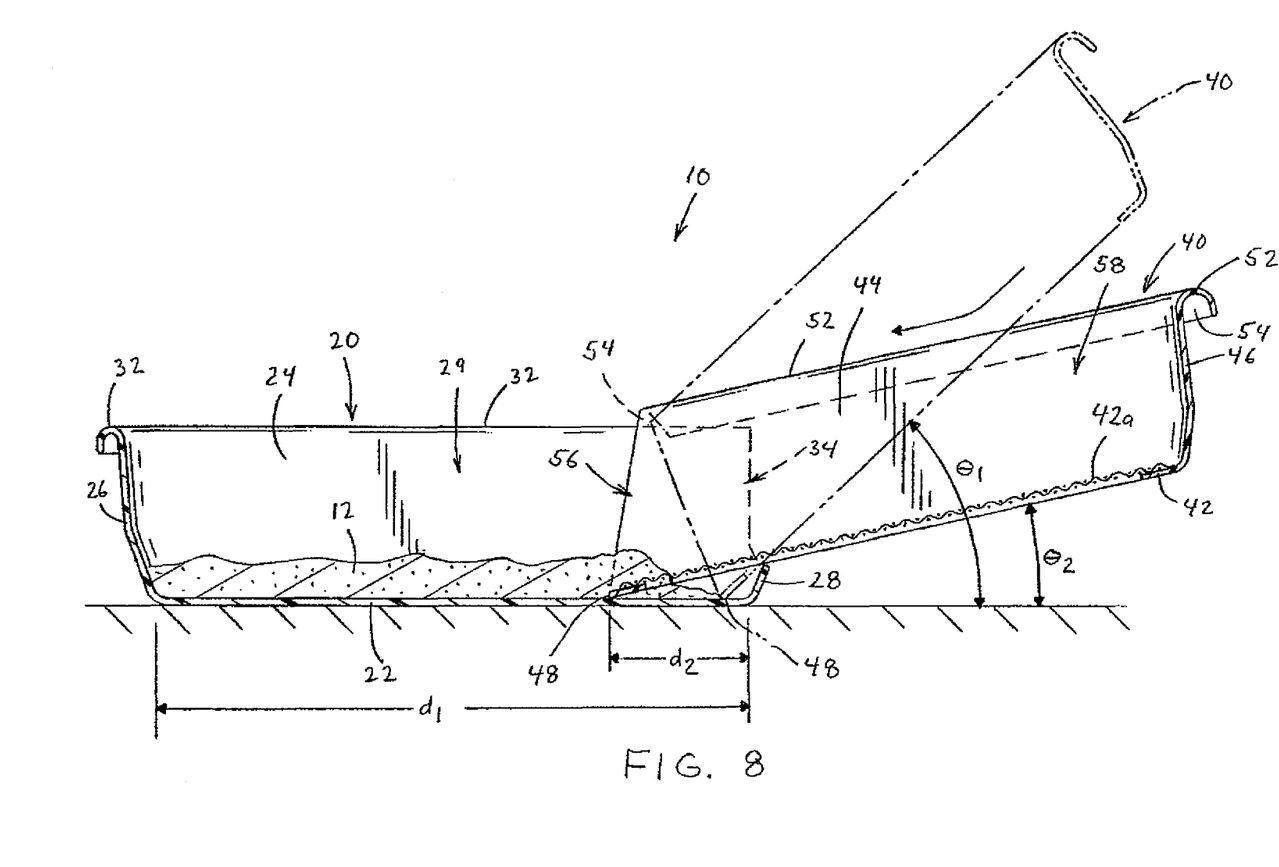
FIG. 8 is a cross sectional view of the litter box assembly showing the insert being inserted into the base tray.

Litter box assembly 10 is re-assembled by inserting insert 40 into base tray 20 through open end 34 of base tray 20. More specifically, insert 40 initially is positioned so that leading edge 48 of insert 40 engages bottom wall 22 of base tray 20 near front wall 28 and a lower surface of bottom wall 42 of insert 40 rests on front wall 28 of base tray 20, as shown in FIG. 8. Front wall 28 has a height such that when leading edge 48 is near front wall 28 the angle formed between bottom wall 22 and bottom wall 42, i.e., angle $\theta_1$, is as small as possible (See FIG. 8). In particular, height ($h_2$) of front wall 28 is designed to permit reinsertion of insert 40 at an angle to scoop litter material 12 near front wall 28 of base tray 20 and to allow for inserting insert 40 into base tray 20 while retaining litter material 12 in base tray 20. Moreover, height ($h_2$) of front wall 28 of base tray 20 and the contoured ends of opposing side walls 44 of insert 40 are designed to allow insert 40 to be inserted beneath litter material 12 while retaining litter material 12 in base tray 20. In the embodiment shown, angle $\theta_1$ is between about 60° and about 30°, preferably between about 50° and about 40°, more preferably about 45°.

As insert 40 continues to be inserted into base tray 20 through open end 34 thereof, leading edge 48 of insert 40 slides along bottom wall 22 of base tray 20 and bottom wall 42 of insert 40 remains in contact with front wall 28 of base tray 20. As shown in FIG. 8, the angle between bottom wall 48 of insert 40 and bottom wall 28 of base tray 20 decreases as insert 40 slides into base tray 20. According to the present invention, when leading edge 48 of insert 40 is disposed a distance ($d_2$) from front wall 28, wherein distance ($d_2$) is about 25% of a distance ($d_1$) between front wall 28 and back wall 26 of base tray 20, the angle between bottom wall 48 and bottom wall 28 (labeled $\theta_2$ in FIG. 8) is between about 5° and about 20°, preferably between about 10° and about 15°, more preferably about 13°.

As insert 40 slides into base tray 20, openings 54 in insert 40 receive flange 32 of base tray 20. In particular, flange 52 of insert 40 mates with and engages flange 32 of base tray 20. Flange 52 of insert 40 and flange 32 of base tray 20 are dimensioned such that the inner surface of flange 52 of insert 40 mates with the outer surface of flange 32 of base tray 20. In this respect, flange 32 of base tray 20 and flange 52 of insert 40 act as guides for directing insert 40 into base tray 20.

Insert 40 slides into base tray 20 until leading edge 48 is disposed next to back wall 26 of base tray 20. Once leading edge 48 is next to back wall 26, back wall 46 of insert 40 moves downward until back wall 46 is disposed next to front wall 28 of base tray 20. In addition, opposing side walls 44 of insert 40 are disposed next to opposing side walls 24 of base tray 20. In this respect, insert 40 is nested into base tray 20, as shown in FIG. 1. The user may then shake re-assembled litter box assembly 10 to distribute evenly litter material 12 therein.

Applicant has manufactured base trays wherein the height ($h_1$) of back wall 26 is 7 inches and the height ($h_2$) of front wall 28 is 1½ inches. Applicant has also manufactured base trays wherein the height ($h_1$) of back wall 26 is 6 inches and height ($h_2$) of the front wall 28 is 1 inch. In a preferred embodiment, height ($h_2$) of front wall 28 is between about 1" and about 2". Applicant has found that each of the foregoing base trays retain sufficient amounts of litter material therein while still allowing insert 40 to be inserted easily into the base tray.

As described in detail above, the present invention provides a litter box assembly 10 that allows for easy and controlled insertion of an insert into a base tray having a litter material therein. According to the present invention, the angle between bottom 28 of base tray 20 and bottom 48 of insert 40 is as small as possible to allow leading edge 48 to wedge easily under litter material 12 in base tray 20. In particular, the present invention allows a user to place the insert at a specific angle relative to the bottom of the base tray so that the insert may more easily "wedge" under the litter material in the base tray. As a result, the present invention is designed so that the user does not have to exert extreme force to position the insert back into the base tray.

The present invention also provides mating flanges on an insert and a base tray to help guide the insert back into the base tray. The mating of the flanges of the insert with the flanges of the base tray aligns properly the insert with the base tray. The present invention thus is designed so that the force exerted by the user is distributed evenly over the face of a leading edge of the insert.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A litter box assembly comprised of:
   a base tray having a bottom wall, opposing side walls, a back wall and a front wall, said front wall having a height less than said opposing side walls to define a partially open end of said base tray and an upper edge of each of said opposing side walls formed to define a flange; and
   an insert dimensioned to be disposed within said base tray, said insert having a bottom wall, opposing side walls and a back wall, said bottom wall having a plurality of openings formed in a portion thereof and a leading edge that extends between ends of said opposing side walls wherein said leading edge of said bottom wall and said ends of said opposing side walls define an open end of said insert, each of said opposing side walls of said insert formed to define a mating flange, each of said mating flanges formed to define an opening at said end of said opposing side wall,
   wherein said insert is insertable into said base tray through said partially open end of said base tray such that when said leading edge of said insert is disposed adjacent to said front wall of said base tray, said opening of each of said mating flanges of said insert receives one of said flanges of said base tray, and wherein said leading edge of said insert engages and slides along said bottom wall of said base tray and each of said mating flanges of said insert engages and slides along one of said flanges of said base tray to guide said insert into said base tray as said insert is inserted into said base tray.

2. A litter box assembly as defined in claim 1, wherein said flange of said base tray and said mating flange of said insert are J-shaped.

3. A litter box assembly as defined in claim 1, wherein said plurality of openings of said insert define a screen portion of said bottom of said insert.

4. A litter box assembly as defined in claim 1, wherein an angle between said bottom of said insert and said bottom of said base tray when said leading edge of said insert engages said bottom wall of said base tray near said front wall of said base tray is between about 60 degrees and about 30 degrees.

5. A litter box assembly as defined in claim 1, wherein said mating flange of said insert extends along a top of said side walls and a top of said back wall of said insert.

6. A litter box assembly as defined in claim 4, wherein said angle is between about 50 degrees and about 40 degrees.

7. A litter box assembly as defined in claim 6, wherein said angle is about 45 degrees.

8. A litter box assembly comprised of:
   a base tray having a bottom wall, opposing side walls, a back wall and a front wall, said front wall having a height that is less than about 50% of the height of said opposing side walls to define a partially open end of said base tray and an upper edge of each of said opposing side walls formed to define a flange; and
   an insert dimensioned to be disposed within said base tray, said insert having a bottom wall, opposing side walls and a back wall, said bottom wall having a plurality of openings formed in a portion thereof and a leading edge that extends between ends of said opposing side walls wherein said leading edge of said bottom wall and said ends of said opposing side walls define an open end of said insert, each of said opposing side walls of said insert formed to define a mating flange, each of said mating flanges formed to define an opening at said end of said opposing side wall,
   wherein said insert is insertable into said base tray through said partially open end of said base tray such that when said leading edge of said insert is disposed adjacent to said front wall of said based tray, said opening of each of said mating flanges of said insert receives one of said flanges of said base tray, and wherein said insert engages and slides along said bottom wall of said base tray and each of said mating flanges of said insert engages and slides along one of said flanges of said base tray to guide said insert into said base tray as said insert is inserted into said base tray.

9. A litter box assembly as defined in claim 8, wherein said front wall has a height that is between about 25% and about 45% of the height of said opposing side walls.

10. A litter box assembly as defined in claim 9, wherein said front wall has a height that is about 25% of the height of said opposing side walls.

11. A litter box assembly comprised of:
- a base tray having a bottom wall, opposing side walls, a back wall and a front wall, said front wall having a height less than said opposing side walls to define a partially open end of said base tray; and
- an insert dimensioned to be disposed within said base tray, said insert having a bottom wall, opposing side walls and a back wall,
- said bottom wall having a plurality of openings formed in a portion thereof and a leading edge that extends between ends of said opposing side walls
- wherein said leading edge of said bottom wall and said ends of said opposing side walls define an open end of said insert and an upper edge of each of said opposing side walls formed to define a flange near said ends of said opposing side walls,
- wherein said insert is insertable into said base tray through said partially open end of said base tray such that said leading edge of said insert engages and slides along said bottom wall of said base tray and
- each of said flanges on said opposing side walls of said insert engages an upper edge of one of said opposing side walls of said base tray as said insert is inserted into said base tray and
- wherein said back wall of said insert has a height equal to said opposing side walls of said base tray such that said back wall of said insert is disposed next to said front wall of said base tray and
- said back wall of said insert closes said partially open end of said base tray when said insert is disposed in said base tray.

* * * * *